United States Patent
Braga et al.

(10) Patent No.: US 6,861,476 B2
(45) Date of Patent: Mar. 1, 2005

(54) MIXTURES OF THERMOPLASTIC ELASTOMERS AND POLAR POLYMERS

(75) Inventors: Vittorio Braga, Ferrara (IT); Virginie Lietard, Brouckerque (FR)

(73) Assignee: Basell Poliolefine Italia S.p.A., Milan (IT)

( * ) Notice: Subject to any disclaimer, the term of this patent is extended or adjusted under 35 U.S.C. 154(b) by 139 days.

(21) Appl. No.: 09/979,935

(22) PCT Filed: May 19, 2001

(86) PCT No.: PCT/EP01/03111

§ 371 (c)(1),
(2), (4) Date: Nov. 26, 2001

(87) PCT Pub. No.: WO01/72893

PCT Pub. Date: Oct. 4, 2001

(65) Prior Publication Data

US 2003/0040582 A1 Feb. 27, 2003

(30) Foreign Application Priority Data

Mar. 28, 2000 (IT) .................................. MI2000A0646

(51) Int. Cl.⁷ .............................. C08F 8/00; C08L 9/00; C08L 23/04; C08L 33/18; C08L 33/20
(52) U.S. Cl. ........................ 525/191; 525/196; 525/221; 525/232; 525/238; 525/240; 428/500; 428/515; 521/73; 521/75
(58) Field of Search .................................. 525/191, 196, 525/221, 232, 238, 240; 521/500, 515, 73, 75

(56) References Cited

U.S. PATENT DOCUMENTS

| | | | |
|---|---|---|---|
| 5,380,785 A | 1/1995 | Ngoc et al. | 524/504 |
| 5,998,019 A | 12/1999 | Rosenbaum et al. | 428/345 |
| 6,207,761 B1 * | 3/2001 | Smith et al. | 525/221 |
| 6,448,335 B1 * | 9/2002 | Braga et al. | 525/71 |

FOREIGN PATENT DOCUMENTS

| | | |
|---|---|---|
| EP | 0472946 | 3/1992 |
| EP | 0588029 | 3/1994 |
| EP | 0688821 | 12/1995 |
| EP | 0849324 | 6/1998 |
| WO | 9915584 | 4/1999 |

* cited by examiner

Primary Examiner—Nathan M. Nutter

(57) ABSTRACT

Compositions of elastoplastic ionomeric polymers having hardness below 92 points Shore A. comprising polar elastomers (10–45 wt. %), such as polyacrylic and nitrile rubbers, apolar crystalline polyolefins (15–40 wt. %) and elastoplastic polyolefins (25–75 wt. %). These compositions are used for making single-layer and multilayer laminar products that can be bonded by radio-freqeuncy welding, and manufactured articles possessing antistatic properties.

30 Claims, No Drawings

MIXTURES OF THERMOPLASTIC ELASTOMERS AND POLAR POLYMERS

This application is the U.S. national phase of International Application PCT/EP01/03111, filed Mar. 19, 2001.

The present invention relates to ionomeric compositions of thermoplastic and elastomeric polymers including polar polymers. The present invention also relates to the process for preparation of these compositions as well as manufactured articles obtainable therewith.

In view of their properties, the objects of the present invention have numerous applications.

An important application of the said compositions is the production of laminar products, i.e. sheets and films, that can be bonded by radio-frequency welding.

Polyolefinic compositions for laminar articles that can be bonded by radio-frequency welding are already known. For example, European patent application EP-A-688 821 describes polyolefinic compositions comprising:

85–97 wt. % of a heterophasic composition comprising a crystalline polyolefin and an elastomeric copolymer of propylene with an α-olefin $CH_2$=CHR, in which R is a $C_2$–$C_8$ alkyl radical; in these copolymers the quantity of ethylene is less than 40 wt. %; the said olefinic polymers can optionally be modified with small amounts of polar monomers; and 3–15 wt. % of one or more polymers having loss factor greater than or equal to 0.01.

With these compositions it is possible to produce laminar articles or sheets that do not have sufficient softness. Thus, the hardness of the aforementioned composition is equal to 32 points Shore D (corresponding to 92 points Shore A) (according to method ASTM D 2240).

The applicant has now found that it is possible to obtain polymeric compositions softer than those described in the aforesaid European patent application that can likewise be used for production of laminar and non-laminar articles, having good weldability with radio frequencies.

The polymeric compositions of the present invention give, as mentioned, manufactured articles with good weldability, which is equivalent or even better than that of the manufactured articles of the cited compositions known in the prior art.

The compositions of the present invention have, typically, a good balance of mechanical, physical-chemical and electric properties.

The said compositions, which are endowed with good mechanical properties, have in particular a good elastic recovery up to 100° C.

Many of the compositions of the present invention have, in addition, better antistatic properties than those described in the aforesaid patent application. Their good ability to disperse electrostatic charges means that these compositions can be used for making articles for which the said property is important, such as conductive soles, footwear for operating theatres and/or hospitals, sanitary articles and instruments (wheels for trolleys and conductive coatings).

As another advantageous characteristic, the compositions of the present invention exhibit reduced absorption of oily substances.

As a further advantageous characteristic, the compositions of the present invention display improved conductivity, conferring improved paintability by electrostatic means.

Accordingly, the present invention provides compositions of thermoplastic and elastomeric ionomeric polymers with hardness of less than 92 points Shore A, preferably equal to or less than 89 points (according to method ASTM D 2240).

The polymeric moiety of the said compositions includes the following components (percentages by weight):

(I) 10–45%, preferably 10–40%, more preferably 12–25%, of a polar elastomeric polymer selected from polyacrylic rubbers (ACM) and nitrile rubbers;

(II) 15–40%, preferably 20–40%, of a nonpolar crystalline olefin polymer, and (III) 25–75%, preferably 30–55%, of a thermoplastic elastomeric polymer comprising polyolefin elastomers.

Preferably the said compositions have at least one of the following properties: tension set at 70° C. of less than 40%; elongation at break of at least 750%; absorption of oily substances (at 23° C. for 7 days) of 45% or less; volumetric resistivity of less than $6.5–10^4$ Ωcm and peeling strength of or over 3 kg/cm$^3$.

Examples of the said polyacrylic rubbers are the rubbers derived from ethyl acrylate, butyl acrylate, methoxy ethylacrylate, ethoxy ethylacrylate etc. The presence of monomers such as vinyl-chloroacetate, β-chloroethylvinyl ether, and alkyl glycidyl ether permits crosslinking reactions.

The aforesaid nitrile rubbers (acrylonitrile-butadiene copolymer) have unsaturated bonds in the chain; however, it is also possible to use the corresponding hydrogenated (HNBR) and modified hydrogenated forms.

The aforesaid polar polymers (I) can also be used blended together in any proportions.

Crystalline polyolefin means a polymer that is insoluble in xylene at room temperature, i.e. at about 25° C., (according to the method described below) to an extent equal to or greater than 80 wt. %, more preferably 90%.

The crystalline polymer is preferably selected from the isotactic and syndiotactic polypropylenes, more specifically from the homopolymers of propylene and its random copolymers with ethylene and/or an α-olefin $CH_2$=CHR, in which R is a $C_2$–$C_8$ alkyl radical.

Examples of the said α-olefins $CH_2$=CHR, in which R is a $C_2$–$C_8$ alkyl radical, are butene-1, pentene-1,4-methylpentene-1, hexene-1 and octene-1. Butene-1 is particularly preferred.

The elastomeric polyolefin polymer of component (III) is preferably an ethylene-propylene random copolymer (EPM) or an unconjugated ethylene-propylene-diene random copolymer (EPDM), both of which are well known in the art. These elastomeric copolymers generally contain up to 75 wt. % of ethylene. The minimum quantity of ethylene is preferably 20 wt. %. The maximum quantity of ethylene is preferably less than 40 wt. %, and more preferably equal to or less than 38 wt. %.

Other polyolefin elastomers that can be used are, for example, the copolymers of ethylene with α-olefins $CH_2$=CHR, in which R is a $C_1$–$C_8$ alkyl group, containing at least 20 wt. %, preferably from 20 to 70%, of a $C_3$–$C_{10}$ α-olefin (according to $^{13}$C-NMR analysis) and with Mw/Mn ratio less than 4, preferably less than 3.

Preferred examples of the aforesaid ethylene/$CH_2$=CHR α-olefin copolymers are the copolymers of ethylene with a comonomer selected from butene-1 and octene-1. In the latter, the content of comonomer preferably varies from 20 to 45 wt. %. Preferably the said copolymers have density less than 0.89 g/ml.

The aforesaid elastomeric polyolefin polymers can be mixed with other elastomers, different from those of component (I). Preferred examples of these other elastomers are:

thermoplastic elastomeric styrene polymers, such as linear or branched block copolymers of styrene, for example the unsaturated copolymers, containing at least one comonomer selected from butadiene, isoprene, and the saturated copolymers, such as styrene-ethylene-butylene and styrene-ethylene-propylene;

poly(ethylene methacrylate) (EMA) and poly(ethylene butylacrylate) (EBA) containing not less than 35 wt. % of acrylic comonomer;

poly(ethylene vinylacetate) (EVA) and ethylene-vinylacetate rubber (EVM) containing not less than 35 wt. % of vinyl acetate comonomer.

As mentioned, the aforesaid elastomeric polyolefin polymers can also be used blended together or with other elastomers in any proportions. Blends containing from 50 to 99 wt. %, more preferably from 65 to 99 wt. % of the said EPM or EPDM rubbers are preferred; the complement to 100 in the said blends consists of the elastomeric polymers listed above.

For the purposes of the present invention, the thermoplastic and elastomeric polymeric compositions consisting of the aforesaid components (II) and (III) described in the published European patent application No. 472946 are particularly suitable for being used together with component (I). These compositions, called heterophasic compositions hereinafter, comprise (percentages by weight):

(A) 5–50%, preferably 10–40%, of a crystalline homopolymer of propylene having solubility in xylene at room temperature greater than 80%, preferably from 85 to 99%, or a crystalline random copolymer of propylene with a comonomer selected between ethylene and a $CH_2$=CHR α-olefin, in which R is a $C_2$–$C_8$ alkyl radical; the said copolymer containing more than 85% of repeating units derived from propylene and having solubility in xylene at room temperature greater than 80%;

(B) 0–20%, preferably 0–15%, of a crystalline copolymer of ethylene with a comonomer selected from propylene and a $CH_2$=CHR α-olefin, in which R is a $C_2$–$C_8$ alkyl radical; the said copolymer being insoluble in xylene at room temperature; and (C) 40–95%, preferably 50–75%, of an elastomeric copolymer of ethylene with a comonomer selected from ethylene and a $CH_2$=CHR α-olefin, in which R is a $C_2$–$C_8$ alkyl radical, and, optionally, small amounts of a diene; the said copolymer containing less than 40%, preferably from 20 to 38%, of repeating units derived from ethylene and being soluble in xylene at room temperature.

The total quantity of ethylene in the heterophasic composition is generally between 15 and 35 wt. %. Furthermore, the intrinsic viscosity of copolymer (C) is generally between 1.5 and 4 dl/g.

In the ethylene-propylene copolymer or the ethylene-propylene-$C_4$–$C_{10}$ α-olefin copolymer of component (B), the quantity of ethylene or the combination of ethylene and $C_4$–$C_{10}$ α-olefin is typically greater than 55 wt %, preferably from 75 to 98 wt. %, more preferably from 80 to 95 wt. %, based on the total weight of component (B). In the ethylene-propylene-$C_4$–$C_{10}$ α-olefin copolymer the $C_4$–$C_{10}$ α-olefin content is preferably from 1 to 10 wt %.

If present, the aforementioned dienes are contained in the elastomeric polymer preferably in quantities of 1–10 wt. %. Preferred examples are butadiene, 1,4-hexadiene, 1,5-hexadiene and ethylidene-norbomene-1.

The said heterophasic composition can be prepared by mixing components (A), (B) and (C) in the fluid state, i.e. above their softening or melting point, or by sequential polymerization in two or more stages in the presence of a highly stereospecific Ziegler-Natta catalyst. Examples of processes of sequential polymerization are described in the cited published European patent application No. 472946. When the heterophasic copolymer (I) is prepared by sequential polymerization, component (B) is present in quantities greater than or equal to 1 wt. %. When the said component (B) is present, it is preferable that the weight ratio (B)/(C) should be less than 0.4. Furthermore, it is preferable that the percentage by weight of component (C) or of the sum of components (B) and (C) relative to the heterophasic copolymer (I) should be between 50 and 90%, and especially between 65 and 80%.

Generally the said heterophasic composition has a flexural modulus below 150 MPa and withstands IZOD impact at −40° C. In addition, it is preferably endowed with the following properties: yield strength between 3 and 20 MPa; tensile strength at break and elongation at break respectively between 10 and 20 MPa and greater than 300%; tension set, at 75% elongation, between 20 and 50%, and Shore D hardness between 30 and 40 points.

In general the polymers (I) are preferably present in the aforesaid compositions in the form of dispersed particles with diameter from 0.05 to 0.7 micrometers, measured by electron microscopy. The shape of these particles is usually spheroidal.

In addition to the aforementioned components, the compositions of the present invention can contain the additives usually employed in the field of polymers, such as stabilizers, pigments and fillers.

The compositions according to the present invention are obtained by applying, to the mixtures of components (I)–(III), the methods known in the art for preparing ionomeric polymers.

The compositions according to the present invention are therefore obtained, for example, by mixing the components (I)–(III) and, optionally other components used, in the presence of functionalized unsaturated monomers and radical initiators; this product from mixing is then further mixed with a metal compound.

The polymers are mixed in the molten state, according to any one of the known techniques, preferably working in an atmosphere of inert gas, for example nitrogen.

The aforesaid mixing operations can be carried out using internal mixers (for example Banbury) or single-screw (for example Buss) or twin-screw (for example Werner) extruders. The temperature of mixing of the polymers in the molten state is preferably between 170 and 250° C.

The ionomeric form of the polymers of the compositions of the present invention is obtained by salification of the polar functional groups present in the polymers with ions of metals generally belonging to Group I or II of the Periodic Table.

In the composition of the present invention, the polymers functionalized with polar groups are graft copolymers in which the polymers of components (I)–(II), and any polymers optionally added, make up the main chain of the graft copolymer, whereas the side chains of the graft copolymer are derived from monomers containing at least one polar functional group selected from the carboxyls and their derivatives, such as anhydrides and esters. Examples of the aforesaid monomers with one or two or more functional groups are the acids of the vinyl monomers, among which those preferred are acrylic and methacrylic acids, methacrylic, itaconic and citraconic, maleic and fumaric acids, and the corresponding anhydrides and esters.

The graft copolymers used in the present invention can be prepared according to known methods.

As already mentioned, one method of carrying out the graft reaction consists, for example, in grafting the aforesaid functionalized monomers on the polymers in the presence of radical initiators. With appropriate selection of the quantities of the aforesaid monomers with functional groups that are added to the polymer to be modified, a polymer modified with functionalized monomers and having the composition described above is obtained. This modification occurs when appropriate quantities of free radical initiator are used (for example peroxides, such as dicumyl peroxide and 2,5-dimethyl-2,5-di(tert-butylperoxy)hexane). The reaction of grafting is preferably carried out in an inert atmosphere, for example in nitrogen.

An alternative method of preparation of the graft copolymer consists in first preparing an additive composed of a polymeric matrix, monomers with a functional group and free radical initiators. Then the said additive is mixed with the mixture of polymers, and any other organic substances optionally used, working as described previously until the reaction of grafting takes place.

It is preferable for the aforesaid polymeric matrix to consist of the same polymers as are to be grafted.

The graft copolymer obtained previously is then mixed with the said metal compound. The metal in the said compound is preferably selected from sodium, lithium, potassium, zinc, magnesium and calcium; the last three in this list are the most preferred.

The metal compound used in the process for preparing ionomeric polymers is, for example, an oxide, a hydroxide or a salt, such as carbonate or preferably an organic salt such as acetate or acetylacetonate, or mixtures of the said compounds.

The quantities of functional groups grafted onto the polymer and of metal ions give the desired degree of crosslinking.

In the composition of the present invention, the aforesaid functionalized unsaturated monomers are preferably present in an amount between 0.1 and 25 wt. %, more preferably between 0.2 and 10 wt. %, based on the weight of the polymeric mass. The said polar groups are neutralized from 1 to 100% with ions of the said metals.

The ionomeric polymer of the present invention is found to be partially crosslinked. The definition "partially crosslinked" means a degree of crosslinking, generally, equal to or less than 20%, preferably not less than 5%. The degree of crosslinking is expressed in terms of content of gel relative to the weight of polymer soluble in hot xylene (135° C.) after crosslinking. The gel corresponds to the polymer moiety that becomes insoluble on account of crosslinking.

The compositions of the present invention are suitable for the preparation of manufactured articles produced by various known processes, for example by extrusion, calendering, thermoforming, injection and compression moulding, and blow-moulding.

As already stated, these compositions are easily workable in the form of laminar products, i.e. sheets and films. Sheets are products with thickness equal to or greater than 100 $\mu$m, whereas films are products with thickness less than 100 $\mu$m. Both sheets and films can be single-layer or multilayer. The single layer of the single-layer laminar product or at least one layer of the multilayer laminar product consists substantially of the compositions of the present invention. In the case of multilayer sheets or films, the layers that do not consist of the compositions of the present invention can consist of olefinic polymers, for example homopolymers or copolymers, especially random, of ethylene or propylene.

In general, the aforesaid laminar products can be prepared by known techniques, such as extrusion and calendering.

To obtain best results in radio-frequency welding of the aforementioned laminar products, it is preferable to preheat the electrodes to temperatures from 40 to 75° C.

The compositions of the present invention are also suitable for the production of foamed articles. These articles are produced in accordance with known technologies, as described for example in international patent application WO 99/15584.

The following examples are given for the purpose of illustrating, but not limiting, the present invention.

Tests were carried out on the compositions of the present invention for evaluating their characteristics and properties; the methodology of these tests is described below.

Percentage of ethylene by weight: IR spectroscopy.

Intrinsic viscosity: determined in tetrahydronaphthalene at 135° C.

Fraction soluble in xylene: determined as percentage of residue soluble in xylene at 25° C. in the following way: prepare a solution of the sample in xylene at a concentration of 1 wt. %, stirring the sample for one hour in xylene at 135° C. Still stirring, allow to cool to 95° C., then pour the solution into a bath thermostated at 25° C. and leave for 20 min without stirring and for a further 10 minutes with stirring again. Then filter the solution and add acetone to an aliquot of the filtrate in order to precipitate the dissolved polymer. The polymer thus obtained is recovered, washed, dried and finally weighed to determine the percentage soluble in xylene.

Melt Index: determined according to method ASTM D 1238, condition L (MIL).

Hardness Shore A or Shore D: determined according to method ASTM D 2240.

Elongation at break: determined according to method ASTM D 412.

Tensile strength at break: determined according to method ASTM D 412.

Tension set: determined according to method ASTM D 412 using a test-piece according to method ASTM D 1329 (10 minutes of tension followed by 10 min of recovery before reading the value of tension-set on the scale).

Absorption in ASTM 3 oil: determined according to method ASTM D 471-79.

Weldability: the test is carried out using an extruded film or a moulded plate as test specimen. The dimensions of the film are: width 20 cm; thickness 0.5 mm. The film is obtained by extrusion at 200° C. in a single-screw Brabender extruder with screw length/diameter ratio of 25. The extruder is equipped with a flat head. The plate, 120×120 mm and 0.5 mm thick, is obtained by compression moulding.

The test specimen is welded to itself using a high-frequency welding set, operating at 27.12 MHz and equipped with a pinch roll with micrometer limit stop, and a heatable electrode.

The welding conditions are as follows:

temperature of heatable electrode: 75° C.,
electrode dimensions: 0.25×11 cm (unless stated otherwise),
current strength: 0.1–2.2 kVA (kilovolt-ampere),
roll pressure: 6 bar (unless stated otherwise), cooling time under pressure: 2 seconds.

The potentiometer used is set to position 6 of the potentiometer scale (scale from 1 to 10), unless stated otherwise.

Peeling: determined according to method ASTM 1876 at 23° C. The speed of peeling is 200 mm/min.

Compositions and Polymers Used in the Examples

Polar polymer: acrylate terpolymer described in U.S. Pat. No. 5,380,785. It is commercialised in the form of powder by Goodyear with the trademark Sunigum® P7395.

Polar polymer: acrylate terpolymer described in U.S. Pat. No. 5,380,785. It is commercialised by Goodyear with the trademark Sunigum® G7687, in the form of granules (pellets) containing the said terpolymer (85 wt. %), ethylene-methylacrylate-glycidyl-methacrylate (EMA-GMA) (10 wt. %) and crystalline polypropylene homopolymer (5 wt. %).

Polar polymer: hydrogenated acrylonitrile-butadiene copolymer (HNBR). It is commercialised by the company Nippon Zeon Co. with the trademark Zetpol® 2000L.

Polar polymer: hydrogenated acrylonitrile-butadiene copolymer modified with methylacrylate zinc. It is commercialised by the company Nippon Zeon Co. with the trademark Zeoforte® ZSC 2095.

Elastomeric copolymer containing 72 wt. % of ethylene and 28 wt. % of 1-octene (according to IR analysis supplied by Dow Chemical); it has hardness of 66 points Shore A and density of 0.863 g/ml. It is commercialised by Dow Chemical with the trademark Engage® 8180.

Elastomeric ethylene-vinylacetate copolymer (EVM) containing 45 wt. % of vinylacetate. It is commercialised by Bayer with the trademark Levapren® 450.

Heterophasic composition (1) having a value of MIL of 0.6 g/10 min; it is composed of (percentages by weight):
  (a) 33% of a random copolymer of propylene and 4.3 of ethylene; this copolymer has an intrinsic viscosity [η] of 1.5 dl/g and about 9% of this is soluble in xylene at room temperature (about 25° C.);
  (b) 6% of ethylene-propylene copolymer insoluble in xylene at 25° C., containing 6% propylene; and
  (c) 61% of amorphous ethylene-propylene copolymer containing 27% of ethylene; this copolymer is soluble in xylene at 25° C. and has an intrinsic viscosity [η] of 3.2 dl/g.

The composition is obtained by sequential polymerization in the presence of a highly stereospecific Ziegler-Natta catalyst with high yield supported on $MgCl_2$.

Heterophasic composition (2): differs from heterophasic composition (1) with respect to the value of MIL, which is 8 g/10 min.

Additive: maleic anhydride (MA) and the peroxide are dispersed in the polymer of the heterophasic composition (1). The quantity of MA by weight relative to the total weight of the polymer is 5%. The quantity of peroxide by weight relative to the total weight of the polymer is 1%.

Zinc oxide master: consisting of 80 parts by weight of ZnO and 20 parts by weight of an ethylene-propylene elastomer. It is commercialised with the trademark Rhenogran® ZnO-80.

EXAMPLE 1

Components listed in Table 1, in the quantities shown there, except the zinc oxide master, are mixed in a Brabender internal mixer operating at 60 rpm and a temperature of 190° C. The zinc oxide master is introduced after 4 minutes from the start of mixing. Mixing continues for a further 3 minutes.

In the mixture thus obtained, the polymeric moiety is composed of 16 wt. % of polar polymer of type (I), 30 wt. % of crystalline polyolefin and 54 wt. % of elastomeric polymer of type (III).

The melt index of the resultant mixture is 1.2 g/10 min.

The properties of the mixture are shown in Table 2.

COMPARATIVE EXAMPLE 1c

A modified heterophasic composition obtained by reaction of 97 parts by weight of heterophasic composition (1) with 3 parts by weight of additive is used. The aforesaid mixes are mixed in a nitrogen atmosphere at 200° C. in a single-screw Brabender extruder.

The additive consists of 94 parts by weight of the said heterophasic composition (1), 5 parts by weight of maleic anhydride and 1 part by weight of 2,5-dimethyl-2,5-bis(tert-butylperoxy)hexane.

90 parts by weight of the said heterophasic composition are mixed with 10 parts by weight of Ternyl B27 polyamide in a single-screw Brabender extruder. Mixing is carried out at a temperature of 240° C. in a nitrogen atmosphere.

The properties of the mixture are shown in Table 2.

COMPARATIVE EXAMPLE 2c

Example 1 is repeated except that neither the additive nor the zinc oxide master is used. The components used and the respective amounts are shown in Table 1.

In the mixture thus obtained, the polymeric moiety consists of about 15 wt. % of polar polymer of type (I), 31 wt. % of crystalline polyolefin and 54 wt. % of elastomeric polymer of type (III).

The properties of the mixture are shown in Table 2.

EXAMPLE 2

Example 1 is repeated, except that the amounts of the polymers are varied, as indicated in Table 1.

In the mixture thus obtained, the polymeric moiety consists of about 20.5 wt. % of polar polymer of type (I), 26.5 wt. % of crystalline polyolefin and 53 wt. % of elastomeric polymer of type (III).

The properties of the mixture are shown in Table 2.

EXAMPLE 3

Example 1 is repeated, except that a Buss 70 mixer is used, operating at 190° C. and 200 rpm. The amounts of the components are shown in Table 1.

In the mixture thus obtained, the polymeric moiety consists of about 40 wt. % of polar polymer of type (I), 23 wt. % of crystalline polyolefin and 37 wt. % of elastomeric polymer of type (III).

The properties of the mixture are shown in Table 2.

EXAMPLE 4

The components indicated in Table 1 are mixed in a single-screw Brabender extruder operating at 100 rpm and at a temperature of 200° C.

In the mixture thus obtained, the polymeric moiety consists of about 21 wt. % of polar polymer of type (I), about 30 wt. % of crystalline polyolefin and about 49 wt. % of elastomeric polymer of type (III).

The properties of the mixture are shown in Table 2.

TABLE 1

| Example and comparative example | 1 | 2c | 2 | 3 | 4 |
|---|---|---|---|---|---|
| Heterophasic comp. (1), wt. % | 70 | 80 | 60 | 51 | 0 |
| Heterophasic comp. (2), wt. % | 0 | 0 | 0 | 0 | 70 |
| Sunigum ® P7395, wt. % | 15 | 15 | 20 | 40 | 0 |
| Sunigum ® G7687, wt. % | 0 | 0 | 0 | 0 | 20 |
| Copolymer with 45% of VA, wt. % | 5 | 5 | 10 | 0 | 0 |
| Additive, wt. % | 5 | 0 | 5 | 4.5 | 5 |
| Rhenogran ® ZnO-80, wt. % | 5 | 0 | 5 | 4.5 | 5 |

TABLE 2

| Example and comparative example | 1c | 1 | 2c | 2 | 3 | 4 |
|---|---|---|---|---|---|---|
| Fraction insoluble in xylene[1], % | — | 28 | 29 | 24 | 21 | 28 |
| Hardness Shore A (5″), points | 32[2] | 84 | 85 | 80 | 82 | 89 |
| Tensile strength at break, MPa | 12 | 11.6 | 13.6 | 10 | 8.8 | 7.3 |
| Elongation at break, % | 600 | 815 | 770 | 780 | 750 | 580 |
| Tension set at 70° C., % | — | 34 | 42 | 34 | — | — |
| Tension set at 100° C., % | — | 41 | 42 | 35 | — | 42 |
| Anodic current input, mA | 240 | ca. 240 | ca. 230 | ca. 240 | ca. 250 | 230 |
| Peeling[3], kg/cm³ | 10[4] | 3.5 ± 0.22 | 2.7 ± 0.30 | 4.9 ± 0.26 | 5.3 ± 0.50 | 3.2 ± 0.84 |

[1]Fraction calculated from the polymeric moiety not yet crosslinked.
[2]Hardness Shore D (points).
[3]Roll pressure: 4 bar; welding time: 5 seconds.
[4]Electrode dimensions: 1.4 × 4 cm; potentiometer scale: 8; welding time: 8 seconds.

EXAMPLE 5

In a Brabender extruder, and operating in the conditions of Example 4, 50% of the composition of Example 3 is mixed with 50% of heterophasic composition (1). The components of the mixture and their amounts are as indicated in Table 3.

In the mixture thus obtained, the polymeric moiety consists of about 20 wt. % of polar polymer of type (I), about 31 wt. % of crystalline polyolefin and about 49 wt. % of elastomeric polymer of type (III).

The properties of the mixture are shown in Table 4.

EXAMPLE 6

Example 5 is repeated, except that the heterophasic composition added in the Brabender extruder is already in ionomeric form obtained by reacting 90 p/w of heterophasic composition (1) with 5 p/w of additive (94 p/w of heterophasic composition (1) with 5 p/w of maleic anhydride and 1 p/w of peroxide) and 5 p/w of Rhenogran® ZnO-80. The components of the final mixture and their amounts are indicated in Table 3.

In this mixture, the polymeric moiety consists of about 20 wt. % of polar polymer of type (I), about 31 wt. % of crystalline polyolefin and about 49 wt. % of elastomeric polymer of type (III).

The properties of the mixture are shown in Table 4.

EXAMPLE 7

Example 5 is repeated, except that in the Brabender extruder the 10% of heterophasic composition (1) is replaced with 10% of elastomeric polymer Engage® 8180. The components of the final mixture and their amounts are shown in Table 3.

In the mixture thus obtained, the polymeric moiety consists of about 20 wt. % of polar polymer of type (I), about 27 wt. % of crystalline polyolefin and about 53 wt. % of elastomeric polymer of type (III).

The properties of the mixture are shown in Table 4.

EXAMPLE 8

Example 5 is repeated, except that in the Brabender extruder the heterophasic composition (1) is replaced with 75% of an ionomeric elastomeric thermoplastic (obtained by reacting 50 p/w of heterophasic composition (1), 40 pfw of elastomeric polymer Engage® 8180. 5 p/w of additive and 5 p/w of zinc oxide master). The polar polymer used in the form of powder (Sunigum® P7395) in Example 5 is replaced with a polar polymer used in the form of a granular composition containing 85 wt. % of polar polymer (Sunigum® G7687).

In the mixture thus obtained, the polymeric moiety consists of about 26 wt. % of polar polymer of type (I), about 16 wt. % of crystalline polyolefin and about 58 wt. % of elastomeric polymer of type (III).

The properties of the mixture are shown in Table 4.

TABLE 3

| Example | 5 | 6 | 7 | 8 |
|---|---|---|---|---|
| Heterophasic composition (1), wt. % | 75.5 | 70.5 | 65.5 | 37.5 |
| Sunigum ® P7395, wt. % | 20.0[1] | 20.0[1] | 20.0[1] | 0 |
| Sunigum ® G7687, wt. % | 0 | 0 | 0 | 25.0[2] |
| Engage ® 8180, wt. % | 0 | 0 | 10 | 30 |
| Additive, wt. % | 2.25 | 4.75 | 2.25 | 3.75 |
| Rhenogran ® ZnO-80, wt. % | 2.25 | 4.75 | 2.25 | 3.75 |

[1]In powder.
[2]In the form of granular composition containing 85 wt. % of polar polymer.

TABLE 4

| Example | 5 | 6 | 7 | 8 |
|---|---|---|---|---|
| Fraction insoluble in xylene[1], % | 28.5 | 29 | 25 | 15 |
| Hardness Shore A (5″) points | 84 | 85 | 83 | 79 |
| Anodic current input, mA | ca. 235 | ca. 235 | ca. 235 | 240 |
| Peeling, kg/cm³ | 5 ± 0.27[2] | 5 ± 0.43[2] | 4.2 ± 0.45[2] | Welds[3] |
| Dispersion of the phases | Good | Good | Good | Good |
| Tactile properties | Glazed | Smooth | Glazed | Smooth Slippery |

[1]Fraction calculated from the polymeric moiety not yet crosslinked.
[2]Roll pressure: 4 bar; welding time: 5 seconds.
[3]Electrode dimensions: 1.4 × 4 cm; potentiometer scale: 8; welding time: 8 seconds.

TABLE 5

| Example | Potentiometer scale | Anodic current input, mA | Welding time, s | Peeling, kg/cm³ | Standard deviation |
|---|---|---|---|---|---|
| 1c | 9 | 240 | 8 | 10[1)] | — |
| 3 | 5 | — | 5 | NW[2)] | — |
| 3 | 6 | 240 | 8 | 7.34 | 0.27 |
| 3 | 7 | 245 | 8 | 8.48 | 0.77 |
| 5 | 8 | — | 5 | NW[2)] | — |
| 5 | 8 | 230 | 8 | 5.43 | 0.87 |
| 5 | 9 | 240 | 6 | 8.54 | 0.71 |
| 5 | 10 | 270 | 6 | 11.35 | 0.72 |
| 6 | 8 | — | 5 | NW[2)] | — |
| 6 | 8 | 240 | 5 | 9.39 | 0.82 |
| 6 | 9 | 250 | 7 | 11.15 | 0.73 |
| 6 | 10 | 280 | 8 | 14.35 | 0.47 |
| 7 | 8 | — | 5 | NW[2)] | — |
| 7 | 8 | 230 | 8 | 6.20 | 0.63 |
| 7 | 9 | 240 | 6 | 7.64 | 0.29 |

[1)]Electrode dimensions: 1.4 × 4 cm; potentiometer scale: 8; welding time: 8 seconds.
[2)]Does not weld.

EXAMPLE 9

Example 1 is repeated, except that 40% of polar elastomeric polymer Zetpol® 2000L is used instead of the polymer Sunigum® P7387. The components used and the respective amounts are indicated in Table 6.

In the mixture thus obtained, the polymeric moiety consists of about 41 wt. % of polar polymer of type (I), about 22 wt. % of crystalline polyolefin and about 37 wt. % of elastomeric polymer of type (III).

The properties of the mixture are shown in Table 6.

COMPARATIVE EXAMPLE 3c

Example 9 is repeated, except that both the additive and the zinc oxide master are omitted. The amounts of the polymers used are given in Table 6.

In the mixture thus obtained, the polymeric moiety consists of about 40 wt. % of polar polymer of type (I), 23.4 wt. % of crystalline polyolefin and 36.6 wt. % of elastomeric polymer of type (III).

The properties of the mixture are shown in Table 6.

EXAMPLE 10

Example 1 is repeated, except that the rubber Zeoforte® ZSC 2095 is used instead of the polymer Sunigum P7387. The components used and the respective amounts are shown in Table 6.

In the mixture thus obtained, the polymeric moiety consists of about 37 wt. % of polar polymer of type (I), about 24 wt. % of crystalline polyolefin and about 39 wt. % of elastomeric polymer of type (III).

The properties of the mixture are shown in Table 7.

TABLE 6

| Example and comparative example | 9 | 3c | 10 | 3 |
|---|---|---|---|---|
| Heterophasic composition (1), wt. % | 50 | 60 | 54.6 | 51 |
| Zetpol ® 2000L, wt. % | 40 | 40 | 0 | 0 |
| Zeoforte ® ZSC 2095, wt. % | 0 | 0 | 36.4 | 0 |
| Sunigum ® P7395, wt. % | 0 | 0 | 0 | 40 |
| Additive, wt. % | 5 | 0 | 4.5 | 4.5 |
| Rhenogran ® ZnO-80, wt. % | 5 | 0 | 4.5 | 4.5 |

TABLE 7

| Example and comparative example | 9 | 3c | 10 | 3 |
|---|---|---|---|---|
| MIL, dg/min | 1.2 | 0.6 | <0.5 | 1.1 |
| Insoluble in xylene[1)], % | 20.6 | 21.6 | 22 | 21 |
| Hardness Shore A, points | 74 | 75 | 79 | 82 |
| Tensile strength at break, MPa | 7.3 | 8.3 | 18.6 | 8.8 |
| Elongation at break, % | 780 | 730 | 850 | 750 |
| Tension set at 23° C., % | 39 | 48 | 38 | — |
| Tension set at 70° C., % | 39 | 40 | 30 | — |
| Tension set at 100° C., % | 35 | 36 | 23 | — |
| Antistatic properties | Good | Good | Good | Good |
| Volumetric resistivity, Ω · cm | 3.2[2)] | 0.11[2)] | 5.7[2)] | 5.7[2)] |
| Absorption in oil[3)] at 23° C. for 7 days, % | 43 | 41 | 38 | 38 |
| Absorption in oil[4)] at 70° C. for 3 days, % | 139 | 133 | 138 | 135 |

[1)]Fraction calculated from the polymeric moiety not yet crosslinked.
[2)]Values expressed in $10^{14}$.
[3)]The heterophasic composition (1) has an absorption in oil (ASTM 3) of 56% at 23° C. for 7 days.
[4)]The heterophasic composition (1) has an absorption in oil (ASTM 3) of 226% at 70° C. for 3 days.

What is claimed is:

1. Compositions of thermoplastic and elastomeric ionomeric polymers having hardness of less than 92 points Shore A according to method ASTM D 2240, in which the polymeric moiety includes the following components (percentages by weight):
    (I) 10–45% of an elastomeric polar polymer selected from polyacrylic rubbers (ACM) and nitrile rubbers;
    (II) 15–40% of a nonpolar crystalline olefinic polymer; and
    (III) 25–75% of a thermoplastic elastomeric polymer including a polyolefinic elastomer.

2. The compositions of claim 1, in which the polyolefin elastomer is an ethylene-propylene random copolymer (EPM) or an ethylene-propylene-diene unconjugated random copolymer (EPDM).

3. The compositions of claim 2, in which the content of ethylene-propylene random copolymer (EPM) or of unconjugated ethylene-propylene-diene random copolymer (EPDM) is from 50 to 99% based on the total quantity of thermoplastic elastomeric polymer.

4. The compositions of claims 2 or 3, further comprising a polyolefin elastomer selected from the copolymers of ethylene with $CH_2=CHR$ α-olefin, in which R is a $C_1$–$C_8$ alkyl group, containing at least 20 wt. % of a $C_3$–$C_{10}$ α-olefin according to $^{13}$C-NMR analysis and with Mw/Mn ratio less than 4.

5. The compositions of claim 2 or 3, further comprising an elastomer selected from:
   (A) thermoplastic elastomeric styrene polymers;
   (B) polyethylene methyl acrylate (EMA) and polyethylene butyl acrylate (EBA) containing at least 35 wt. % of acrylic comonomer; and
   (C) polyethylene vinyl acetate EVA and ethylene vinylacetate rubber (EVM) containing at least 35 wt. % of vinyl acetate comonomer.

6. The compositions of claim 1, comprising a heterophasic composition comprising by weight:
   (A) 5–50% of a crystalline homopolymer of propylene having solubility in xylene at room temperature greater than 80%, or a crystalline random copolymer of propylene with a comonomer selected from ethylene and a $CH_2$=CHR α-olefin, in which R is a $C_2$–$C_8$ alkyl radical; the said copolymer containing more than 85% of repeating units derived from propylene and having solubility in xylene at room temperature greater than 80%;
   (B) 0–20% of a crystalline copolymer of ethylene with a comonomer selected from propylene and a $CH_2$=CHR α-olefin, in which R is a $C_2$–$C_8$ alkyl radical; the said copolymer being insoluble in xylene at room temperature; and
   (C) 40–95% of an elastomeric copolymer of ethylene with a comonomer selected from ethylene and a $CH_2$=CHR α-olefin, in which R is a $C_2$–$C_8$ alkyl radical, and, optionally, small amounts of a diene; the said copolymer containing less than 40% of repeating units derived from ethylene and being soluble in xylene at room temperature.

7. The compositions of claim 5, further comprising a polyolefinic elastomer selected from:
   (1) copolymers of ethylene with $CH_2$=CHR α-olefin, in which R is a $C_1$–$C_8$ alkyl group, containing at least 20 wt % of a $C_3$–$C_{10}$ α-olefin according to $^{13}$C-NMR analysis and with Mw/Mn ratio less than 4;
   (2) thermoplastic elastomeric styrene polymers;
   (3) polyethylene methyl acrylate (EMA) and polyethylene butyl acrylate (EBA) containing at least 35 wt. % of acrylic comonomer;
   (4) polyethylene vinyl acetate EVA and ethylene vinyl acetate rubber (EVM) containing at least 35 wt. % of the acrylic comonomer.

8. The compositions of claim 5 in which the ethylene-propylene random copolymer (EPM) or the ethylene-propylene-diene unconjugated random copolymer (EPDM) is from 50 to 99% based on the total amount of thermoplastic elastomeric polymer.

9. A process for preparing compositions of thermoplastic and elastomeric ionomeric polymers having hardness of less than 92 points Shore A according to method ASTM D 2240, in which the polymeric moiety includes the following components (percentages by weight):
   (I) 10–45% of an elastomeric polar polymer selected from polyacrylic rubbers (ACM) and nitrile rubbers;
   (II) 15–40% of a nonpolar crystalline olefinic polymer; and
   (III) 25–75% of a thermoplastic elastomeric polymer including a polyolefinic elastomer; the process comprising the steps:

1) mixing the components (I)–(III) in the molten state in the presence of functionalized unsaturated monomers and radical initiators; and
   2) mixing the product obtained in the preceding stage with a metal compound.

10. Single-layer or multilayer sheets and films having at least one layer produced with compositions of thermoplastic and elastomeric ionomeric polymers having hardness of less than 92 points Shore A according to method ASTM D 2240, in which the polymeric moiety includes the following components (percentages by weight):
   (I) 10–45% of an elastomeric polar polymer selected from polyacrylic rubbers (ACM) and nitrile rubbers;
   (II) 15–40% of a nonpolar crystalline olefinic polymer; and
   (III) 25–75% of a thermoplastic elastomeric polymer including a polyolefinic elastomer.

11. The multilayer sheets and films of claim 10 further comprising at least one layer of olefinic polymers.

12. Foamed articles produced with compositions of thermoplastic and elastomeric ionomeric polymers having hardness of less than 92 points Shore A according to method ASTM D 2240, in which the polymeric moiety includes the following components (percentages by weight):
   (I) 10–45% of an elastomeric polar polymer selected from polyacrylic rubbers (ACM) and nitrile rubbers;
   (II) 15–40% of a nonpolar crystalline olefinic polymer; and
   (III) 25–75% of a thermoplastic elastomeric polymer including a polyolefinic elastomer.

13. The compositions according to claim 1 having hardness no greater than 89 points Shore A.

14. The compositions according to claim 1, wherein component (I) comprises 10–40 wt. % of an elastomeric polar polymer selected from polyacrylic rubbers (ACM) and nitrile rubbers.

15. The compositions according to claim 1, wherein component (I) comprises 12–25 wt. % of an elastomeric polar polymer selected from polyacrylic rubbers (ACM) and nitrile rubbers.

16. The compositions according to claim 1, wherein component (II) comprises 20–40 wt. % of a nonpolar crystalline olefinic polymer.

17. The compositions according to claim 1, wherein component (III) comprises 35–55 wt. % of a thermoplastic elastomeric polymer including a polyolefinic elastomer.

18. The compositions according to claim 4, comprising 20–70 wt. % of a $C_3$–$C_{10}$ α-olefin according to $^{13}$C-NMR analysis and with Mw/Mn ratio less than 3.

19. The compositions according to claim 5, wherein the thermoplastic elastomeric styrene polymers comprise linear or branched block copolymers of styrene.

20. The compositions according to claim 19, wherein the linear or branched block copolymers of styrene comprise unsaturated copolymers containing at least one comonomer selected from butadiene and isoprene.

21. The compositions according to claim 19, wherein the linear or branched block copolymers of styrene comprise saturated copolymers.

22. The compositions according to claim 21, wherein the saturated copolymers are chosen from styrene-ethylene-butylene and styrene-ethylene-propylene.

23. The compositions according to claim 6, wherein component (A) comprises 10–40 wt. % of a crystalline homopolymer of propylene having solubility in xylene at room temperature from 85–99 wt. %.

24. The compositions according to claim 6, wherein component (B) comprises 0–15% of a crystalline copolymer of ethylene with a comonomer selected from ethylene and a $CH_2=CHR$ α-olefin, in which R is a $C_2-C_8$ alkyl radical; the said copolymer being insoluble in xylene at room temperature.

25. The compositions according to claim 6, wherein component (C) comprises 50–75 wt. % of an elastomeric copolymer of ethylene with a comonomer selected from ethylene and a $CH_2=CHR$ α-olefin, in which R is a $C_2-C_8$ alkyl radical, and, optionally, small amounts of a diene; the said copolymer containing from 20 to 38%, of repeating units derived from ethylene and being soluble in xylene at room temperature.

26. The compositions according to claim 7, wherein component (1) comprises copolymers of ethylene with $CH_2=CHR$ α-olefin, in which R is a $C_1-C_8$ alkyl group, containing from 20 to 70 wt. %, of a $C_3-C_{10}$ α-olefin according to $^{13}$C-NMR analysis and with Mw/Mn ratio less than 3.

27. The compositions according to claim 7, wherein component (2) comprises linear or branched block copolymers of styrene.

28. The compositions according to claim 27, wherein the linear or branched block copolymers of styrene comprise unsaturated copolymers containing at least one comonomer selected from butadiene and isoprene.

29. The compositions according to claim 27, wherein the linear or branched block copolymers of styrene comprise saturated copolymers.

30. The compositions according to claim 29, wherein the saturated copolymers are chosen from styrene-ethylene-butylene and styrene-ethylene-propylene.

* * * * *